3,826,846
ANTIFUNGAL COMPOSITION AND METHOD OF ALKYLENEBISDITHIOCARBAMATE COMPLEX COMPOUNDS
Robert L. Noveroske, 1401 Snyder Lane, Walnut Creek, Calif. 94598
No Drawing. Continuation-in-part of application Ser. No. 755,435, Aug. 26, 1968, now Patent No. 3,536,742. This application Sept. 16, 1970, Ser. No. 72,791
Int. Cl. A01n 9/00, 9/12
U.S. Cl. 424—289       13 Claims

ABSTRACT OF THE DISCLOSURE

Novel complexes of alkanolamines with zinc-containing ethylenebisdithiocarbamates or 1,2 - propylenebisdithiocarbamates such as complex compounds of from 1 to 4 moles zinc ethylenebisdithiocarbamate with one mole 2-(2 - aminoethylamino)ethanol(aminoethylethanolamine) are prepared by mixing together a water-soluble ethylenebisdithiocarbamate, water-soluble salts of zinc and one or more additional metal such as manganese or iron and one or more alkanolamines. The complex compounds are stable and can be used to regulate the growth of plants. They are useful as antifungal agents for the control of such fungi as apple scab fungus, rice blast, grape downy mildew and late blight organisms. They also are useful for promoting the growth of higher plants such as grapes, potatoes and the like.

CROSS-REFERENCE TO RELATED APPLICATION

This is a continuation-in-part of my copending application, Ser. No. 755,435, filed Aug. 26, 1968, U.S. Pat. 3,536,742.

BACKGROUND OF THE INVENTION

The novel complex compounds of the invention are stable complexes of zinc-containing ethylenebisdithiocarbamates or 1,2-propylenebisdithiocarbamates with alkanolamines. The compounds are useful as antifungal agents and plant growth regulators.

Many known antifungal agents, when applied to the above-ground portions of higher plants, give effective fungus control; however, they also damage blossoms and young fruit with which they come into contact, and thus cannot be used to equal advantage in all instances. In other cases, antifungal agents which give neither rapid nor complete protection from fungi have been used because of their low phytotoxicity. Still other antifungal agents have a low redistribution potential (i.e., poor translocation characteristics through the plant cellular structure) and may thus require several days to diffuse outwardly from the immediate zone or area of contact on the plant so as to protect all surfaces subject to fungal attack. During this redistribution time, the activity of the agent decays in substantial measure, with the result that effective control of the fungus is still not obtained, particularly under conditions of severe fungal attack. Still other antifungal agents have high mammalian toxicity and have thus been hazardous to use in a number of instances.

It is an object of this invention to provide novel complex compounds which are stable, which not only possess the high antifungal activity and good translocation properties, but which also have low phytotoxicity levels and low mammalian toxicity. It is a further object of the invention to provide novel complex compounds which possess the above-described properties and which, in addition, possess the property of enhancing the growth of higher plants.

SUMMARY OF THE INVENTION

This invention is directed to alkylenebisdithiocarbamate·alkanolamine complex compounds and to a method and composition employing the same, and is particularly directed to metallic zinc-containing alklenebisdithiocarbamate·alkanolamine complex compounds wherein the metal is from 30, to 40, to 50, to 60, to 70, to 80, to 90, to 95, to 100 mole percent zinc and from 70, to 60, to 50, to 40, to 30, to 20, to 10, to 5, to zero mole percent of an additional metal which can be one or more of manganese, nickel, iron, cobalt or copper; and the alkanolamines is one or more alkanolamine of the formula

$$R\text{—}(NHCH_2CH_2\text{—})_xOH$$

wherein R represents hydrogen or 2-hydroxyethyl and $x$ represents an integer from 1, to 2, to 3, the molar ratio of zinc to the alkanolamine in the complex compound being from 16:1, to 12:1, to 10:1, to 8:1, to 4:1, to 3:1, to 2:1, to 1:1, to 0.5:1.

The term "alkylene" is employed in the present specification and claims to designate ethylene or 1,2-propylene. Thus, the term "alkylenebisdithiocarbamate" designates one of ethylenebisdithiocarbamate and 1,2-propylenebisdithiocarbamate.

The term "polymetallic zinc-containing alkylenebisdithiocarbamate" is employed in the present specification and claims to designate the polymeric alkylenebisdithiocarbamate obtained by the reaction of an alkylenebisdithiocarbamate ion with an equivalent amount of two or more water-soluble metal salts, one of which is a zinc salt. In such compounds, the metals are chemically combined in amounts corresponding to their starting molar ratios. The zinc and additional metal ions are at least divalent such as manganous, ferrous, cupric, nickelous, ferric and cobaltous ions, and since the alkylenebisdithiocarbamate ion is divalent, the several ions are combined to form a polymeric product.

Polymetallic zinc - containing alkylenebisdithiocarbamates can also be described as "coreacted zinc metal alkylenebisdithiocarbamates" in accordance with the nomenclature of Nemec et al., U.S. Pat. No. 3,210,394.

The invention includes and is exemplified by each compound wherein the metal is present at any intermediate value between 30 and 100 mole percent of zinc with a corresponding intermediate value for the total quantity of additional metal between 70 and zero mole percent, and wherein the ratio of zinc to alkanolamine is present in any intermediate ratio of from 16:1 to 0.5:1.

Representative intermediate ratios of zinc to additional metal (zinc:additional metal) include, for example, 31:69, 52.5:47.5, 66.33:33.67, 72.43:27.57 and 99.5.0.5. Representative intermediate molar ratios of zinc to alkanolamine (zinc:alkanolamine) include such ratios as 1.33:1, 0.7:1, 2.5:1, 0.93:1, 11:1, 12.8:1 and the like.

For the sake of convenience, the compounds defined above will be referred to herein simply as "complex compounds." Individual complex compounds will be named as zinc metal ethylenebisdithiocabamate·alkanolamines or zinc metal 1,2-propylenebisdithiocarbamate·alkanolamines with the molar percentage of zinc or additional metal being given in parentheses immedaitely following the word "zinc" or the name of the additional metal, and the molar ratio of zinc to alkanolamine being expressed in parentheses at the end of the name. In general, the additional metals employed in the complex compounds are employed in a divalent form, with the exception of iron. When the valence of an additional metal is greater than two, the valence will be indicated by a Roman numeral following the name of such metal, while the absence of a Roman numeral will indicate that the metal is divalent in the complex compound named. E.g., "iron"

is ferrous iron, "iron III" is ferric iron and "copper" is cupric copper. When an additional metal is present in a hydrated form, as manganese dihydrate, the water of hydration will be expressed by a term such as "dihydrate." In complex compounds wherein zinc is the sole metal, i.e., the ratio of zinc:additional metal is 100:0, the molar ratio of zinc to additional metal will not be expressed.

The alkanolamine can be from 1, to 2, to 3, to 4, to 5, to 6 of the six different alkanolamines represented by the above formula. In general, it is preferred that the alkanolamine be a single specific alkanolamine or a mixture of two specific alkanolamines. In those cases in which the complex compound includes more than one type of alkanolamine, each alkanolamine moiety will be expressed separately with the molar ratio of the named alkanolamine to zinc stated parenthetically immediately following the name of the alkanolamine, e.g., zinc ethylenebisdithiocarbamate·diethanolamine(3:1)·2,2' - (ethylenediimino)diethanol(3:1). The alkanolamine moiety can also be named as an aminoalkanol and such nomenclature is employed herein in lieu of alkanolamine nomenclature in certain cases for the sake of clarity. In other cases, it is simpler to name the alkanolamine as such. For example, in the present specification and claims, 2-(2-aminoethylamino)ethanol is named aminoethylethanolamine.

Representative complex compounds of the invention, named as described above, include zinc ethylenebisdithiocarbamate·aminoethylethanolamine (2:1),
zinc ethylenebisdithiocarbamate·aminoethylethanolamine (16:1),
zinc(90)iron III(5)manganese dihydrate(5)ethylenebisdithiocarbamate·aminoethylethanolamine(3:1),
zinc(70)-iron(5)manganese(20)cobalt(5)ethylenebisdithiocarbamate·aminoethylethanolamine(1:1),
zinc(95)manganese(3)iron(2)ethylenebisdithiocarbamate·aminoethanol(1:1),
zinc(95)copper(5)ethylenebisdithiocarbamate·aminoethanol(2:1),
zinc ethylenebisdithiocarbamate·aminoethanol(4:1),
zinc ethylenebisdithiocarbamate·2-((2-(2-aminoethylamino)ethyl)-amino)ethanol(3:1),
zinc ethylenebisdithiocarbamate·diethanolamine(2:1),
zinc ethylenebisdithiocarbamate·2,2'-(ethylenediimino)diethanol(2:1),
zinc ethylenebisdithiocarbamate·2,2'-(diethylenetriimino)diethanol(2:1),
zinc 1,2-propylenebisdithiocarbamate·aminoethylethanolamine(1.4:1),
zinc 1,2-propylenebisdithiocarbamate·aminoethylethanolamine(3:1),
zinc 1,2-propylenebisdithiocarbamate·aminoethylethanolamine(16:1),
zinc 1,2-propylenebisdithiocarbamate·diethanolamine (3.5:1),
zinc (37.5)manganese(62.5)1,2-propylenebisdithiocarbamate·aminoethanol(1:1),
zinc(95)manganese(1)iron(1)copper(1)cobalt(1)nickel(1)ethylenebisdithiocarbamate·aminoethylethanolamine(2.6:1),
zinc(70)manganese(30)1,2-propylenebisdithiocarbamate·aminoethylethanolamine(2:1)·ethanolamine(2:1),
zinc(50)manganese(50)1,2-propylenebisdithiocarbamate·aminoethylethanolamine(1:1),
zinc(90)manganese dihydrate(5)iron III(5)ethylenebisdithiocarbamate·aminoethylethanolamine(3:1),
zinc ethylenebisdithiocarbamate·aminoethylethanolamine (1:1),
zinc ethylenebisdithiocarbamate·aminoethylethanolamine (3:1),
zinc ethylenebisdithiocarbamate·aminoethylethanolamine (12:1),
zinc ethylenebisdithiocarbamate·diethanolamine(3:1),
zinc ethylenebisdithiocarbamate·aminoethanol(0.5:1),
zinc(95)manganese(5)ethylenebisdithiocarbamate·aminoethylethanolamine(2:1),
zinc(70)manganese(30)ethylenebisdithiocarbamate·aminoethylethanolamine(1.4:1),
zinc(30)manganese(70)ethylenebisdithiocarbamate·aminoethylethanolamine(3:1),
zinc(50)manganese(50)ethylenebisdithiocarbamate·aminoethylethanolamine(3:1),
zinc(90)manganese(5)iron III(3)copper(2)ethylenebisdithiocarbamate·aminoethylethanolamine(3:1),
zinc ethylenebisdithiocarbamate·aminoethylethanolamine(4:1) and
zinc ethylenebisdithiocarbamate·aminoethylethanolamine (6:1).

The novel compounds of the present invention are generally amorphous or crystalline solid materials, most of which are white but which may also have other colors, particularly when the compound is a polymetallic complex compound. The complex compounds are very slightly soluble in water and organic solvents. The complex compounds form moderately stable dispersions in aqueous solutions of alkanolamines. The complex compounds evidence characteristic melting or liquefaction points or decomposition points. Certain of the complex compounds visibly decompose on heating without appearing to melt or evaporate. On heating, many of the complex compounds appear to melt or liquefy at a temperature characteristics of the particular complex compound; however, cooling of many of the complex compounds does not always result in resolidification at the characteristic melting temperature, nor are the melted and resolidified products always identical with the original complex compound. The terms "melting" and "melting point" will be employed herein to designate such characteristic temperature at which a particular complex compound melts, liquefies or appears to melt, as distinguished from the temperature at which particular complex compounds decompose without melting or evaporating.

The complex compounds of the invention have been found to be useful for altering the growth of plants. The compounds have been found to inhibit the growth of lower plants such as fungi, while exhibiting no significant phytotoxicity to higher plants. The compounds have also been found to enhance the growth of higher plants. The present complex compounds are particularly useful for the control of a wide range of fungi, especially those fungal organisms ordinarily found on the aerial portions or on the seeds of higher plants such as, for example, cherry leaf spot, apple scab, rice blast, downy mildews, damping-off of cottonseed, Helminthosporium leaf spot on grasses, cereals and corn, cereal rusts, Pythium on corn or pea seeds, Cercospora and Septoria leaf spots and late blight. For control of such organisms, a plant or plant part or plant growth medium is contacted with a plant growth-altering amount of one or more complex compounds of the invention.

The complex compounds of the present invention can be applied to growing vegetation or to seeds of higher plants in amounts required for effective fungal control without significant injury to the plants. Also, the complex compounds are useful both in eliminating established fungal infestation as well as in providing residual and extended control against fungal attack. Further, the complex compounds exhibit high redistribution potentials, that is, they are readily distributed or translocated through the cellular structure or plant contacted therewith and can thus effect rapid coverage and protection of plant parts when applied thereto. Also, application of the present complex compounds to higher plants in plant growth-altering amounts can beneficially be used to stimulate plant growth on such crop plants as grapes, potatoes and celery, for example, even in the absence of significant fungal disease pressure. It is a yet further advantage that the complex compounds have low mammalian toxicity and can thus be handled with a minimum of danger from accidental mammalian exposure thereto.

For such uses, preferred complex compounds are those wherein the additional metal, when present, is trivalent iron or divalent manganese, copper, cobalt or nickel. A preferred group of complex compounds includes those wherein the mole ratio of zinc to additional metal is from 60:40 to 100:0 and wherein the additional metal is divalent manganese, copper, cobalt or nickel or ferric iron. A preferred group of compounds includes those complex compounds wherein the mole ratio of the zinc to the additional metal is from 60:40 to 100:0, the additional metal is selected from manganese and iron, the alkanolamine is one wherein R is hydrogen and the molar ratio of zinc to alkanolamine is from 1:1 to 8:1. Another preferred group of compounds includes those wherein the alkanolamine is aminoethylethanolamine. Another preferred group of compounds includes those wherein the mole ratio of zinc to the additional metal is from about 90:10 to 100:0, wherein the additional metal is manganese or iron or both, wherein the alkanolamine is aminoethylethanolamine and wherein the mole ratio of zinc to alkanolamine is from 1:1 to 4:1.

The complex compounds of the invention can be prepared by the reaction of a water-soluble alkali metal or ammonium alkylenebisdithiocarbamate, water-soluble salts of zinc or mixtures of water-soluble salts of zinc and additional metals and an alkanolamine corresponding to the above formula. Representative water-soluble alkylenebisdithiocarbamate starting materials include ethylenebisdithiocarbamate or 1,2-propylenebisdithiocarbamate salts of lithium, sodium, potassium or ammonium, for example. Representative water-soluble salts of zinc or of manganese, iron, copper, nickel or cobalt include the chloride, sulfate, nitrate or acetate salts, for example. The alkanolamine reactant is preferably added as the free base, though salts thereof such as the sulfates, phosphates, nitrates, hydrohalides, acetates, citrates and the like can also be employed. When the alkanolamine is employed as a salt, the acidity of the reaction mixture is adjusted by the addition of a base such as sodium hydroxide to liberate the free base alkanolamine.

The complex compounds are formed when the reactants are contacted and mixed in an inert solvent. Representative inert solvents which can be employed as reaction media include water, methanol, ethanol, isopropanol and mixtures thereof, aqueous media being preferred. The reaction proceeds at temperatures between about 10° and 50° C. in an aqueous or alcoholic medium and is generally complete in from about 2 to 60 minutes. The zinc-containing alkylenebisdithiocarbamate·alkanolamine complex compound product precipitates in the reaction mixture. The precipitated product can be isolated by filtration, decantation, centrifugation or other conventional methods and the product can be purified by conventional procedures such as washing with water, methanol, aqueous methanol or the like to remove any unreacted starting materials which may be present. The complex compound product can be employed to control fungi and enhance plant growth directly with or without purification, or it can be purified by washing and dried under ambient or reduced pressures at temperatures which are well below the decomposition point of the particular product. Temperatures of from about 35° to 75° C. are advantageously employed in drying the product.

The reactants combine to form a zinc-containing alkylenebisdithiocarbamate complex compound when mixed together in any proportions; however, the identity of the product produced in a given instance is dependent upon the molar proportions of certain of the reactants employed.

Thus, in the preparation of the polymetallic complex compounds of the invention, it is critical and essential that the water-soluble salts of the zinc and the additional metal or metals be employed in substantially the same molar proportions (based on the metal content of each salt) as are desired to be obtained in the final product.

The water-soluble zinc or additional metal salt reactants are thus employed in such proportions as to provide zinc ions in the reaction mixture in the amount of from about 30 to 100 mole percent of the metal ions provided by such reactant. When substantially less than 30 mole percent of the metal ions are provided by the zinc salt, such as 10 or 20 mole percent, the product obtained will contain a corresponding ratio of zinc to the additional metal and will not possess many of the desirable plant growth-altering properties of the complex compounds of the invention. The relative proportions of water-soluble alkylenebisdithiocarbamate and water-soluble zinc or additional metal salts are not critical and any unreacted excess of either reactant can be separated from the complex compound product by conventional procedures such as filtration and washing. In a preferred procedure, the water-soluble salts of zinc or the additional metals and the water-soluble alkylenebisdithiocarbamate are employed in stoichiometric proportions. Thus, it is preferred to employ sufficient alkylenebisdithiocarbamate to react with the zinc and metal reactants without employing a significant excess of alkylenebisdithiocarbamate.

The minimum amount of alkanolamine reactant to be employed is likewise critical to the preparation of the complex compounds. Sufficient alkanolamine must be employed to provide at least one-sixteenth molar proportion of alkanolamine for every molar proportion of zinc in the desired product. When substantially less alkanolamine is employed, such as 0.02 or 0.01 molar proportion of alkanolamine per molar proportion of zinc, products are obtained which contain little or no alkanolamine and which lack many desirable plant growth-altering properties, such as high antifungal potency. When using one or more additional metal salt reactants along with zinc, the molar content of the zinc alone is taken into account when calculating the amount of alkanolamine. In such a case, the alkanolamine reactant is employed in an amount of at least one-sixteenth the molar proportion of zinc salt reactant employed. When the alkanolamine reactant is a mixture of two or more alkanolamines, the total molar quantity of alkanolamine reactants must be at least one-sixteenth the molar quantity of zinc to be present in the desired product. It is generally preferred to employ all the reactants in stoichiometric amounts, in which case from one-sixteenth to 2 molar proportions of alkanolamine reactant are employed for every molar proportion of zinc salt reactant. In most cases, the exact proportions of zinc salt reactant and alkanolamine to be employed correspond to the molar ratio of zinc and alkanolamine desired in the final product. When the final product is to contain from 1 to 2 moles of alkanolamine per mole of zinc, or when the alkanolamine reactant contains secondary amino, but no primary amino group, the use of an excess of alkanolamine reactant is preferred.

Under a given set of reaction conditions of temperature, solvent, mole concentrations of reactants and the like, a greater or lesser excess of alkanolamine may be required to produce a complex compound having a particular molar ratio of zinc to alkanolamine. In any such case, elemental analysis of the solid complex compound will readily provide information as to the molar ratio of zinc to alkanolamine in the product obtained. When the product is found by elemental analysis to contain a higher or lower ratio of zinc to alkanolamine than desired, the excess of alkanolamine reactant employed can be increased or decreased, respectively, to produce a product having the desired ratio. Simple and routine variations in the amount of alkanolamine reactant will enable one to determine the exact excess of alkanolamine to be employed under any given set of reaction conditions to obtain a product having a particular ratio of zinc to alkanolamine.

In a convenient procedure for the preparation of the complex compounds of the invention, a water-soluble alkylenebisdithiocarbamate, a water-soluble zinc salt, an alkanolamine corresponding to the above formula and, optionally, one or more additional metal salts are mixed together with an inert solvent, preferably water, in any order or fashion. In a preferred procedure, the water-soluble alkylenebisdithiocarbamate is first dissolved in the inert solvent and the alkanolamine reactant, water-soluble zinc salt and additional water-soluble metal salts are added to the solution in the required proportions. The amount of inert solvent employed is preferably such as to provide from about 5 to about 25 percent by weight of solids in the ultimate reaction mixture. In such procedure, the alkanolamine reactant, the water-soluble zinc salt and any additional metal salt employed can be mixed together in the required proportions with additional inert solvent and added as a solution, or they can be added individually to the alkylenebisdithiocarbamate solution. When it is desired to mix the alkanolamine with a manganese salt prior to adding the mixture to the alkylenebisdithiocarbamate solution, it is preferred to mix the manganese salt and alkanolamine in methanol. The reaction mixture is then mechanically mixed and held at a temperature within the reaction temperature range until precipitation of the complex compound is complete. The product is conveniently separated from the reaction mixture by filtration. The complex compound is obtained as a filter cake which can be employed directly to alter the growth of plants, including fungal plants. Alternatively, the product can be washed with water or methanol and dried by conventional procedures. When a complex compound containing manganese is not dried, or is dried at temperatures less than about 40° C., the complex compound product generally contains the manganese in the form of the dihydrate. Drying the product at temperatures of 70° C. or higher removes the water of hydration. Complex compounds containing either the hydrated or dehydrated manganese are similarly useful for influencing the growth of plants. Since the hydrated manganese complex compounds require no particular isolation or drying steps for their preparation, they are generally more conveniently employed in plant growth-influencing operations.

In an alternate method of preparation, the complex compounds can be prepared by the reaction of one or more alkanolamines corresponding to the above formula with a zinc alkylenebisdithiocarbamate or with a polymetallic zinc-containing alkylenebisdithiocarbamate. These salts can be employed either per se or in the form of a wettable powder composition containing surfactants or the like in which the salts are present. The formation of the complex compound proceeds when the reactants are mixed together in an inert aqueous or alcoholic liquid reaction medium, preferably water. The reaction proceeds at temperatures from about 10° to about 50° C. and is generally complete in from about 30 to about 120 minutes. The complex compound product can be employed directly to influence the growth of plants by the application of the diluted or undiluted reaction mixture to plants or plant parts. Alternately, the product can be separated and purified by conventional procedures such as filtration and washing.

The proportions of the reactants to be employed generally correspond to the molar ratio of zinc to alkanolamine to be obtained in the product. Consequently, it is essential that at least one-sixteenth molar proportion of alkanolamine be employed for each molar proportion of zinc in the zinc-containing alkylenebisdithiocarbamate starting material. The use of substantially less alkanolamine reactant, such as one thirty-second or one sixty-fourth mole per mole of zinc, results in a loss of desirable plant growth-altering properties such as antifungal potency and lack of phytotoxicity, and in the preparation of products containing little or no alkanolamine. If the complex compound is to contain a precise amount of the alkanolamine such as, for example, ¼, ½ or ¾ mole of alkanolamine per mole of zinc, then the alkanolamine and the zinc-containing reactant should be employed in corresponding proportions. In such operations, the mixture is well stirred and is held for a sufficient period of time for the reaction to go to completion.

When it is desired to prepared a complex compound which contains more than about one mole of the alkanolamine per mole of zinc, or when the alkanolamine reactant is one which contains secondary but no primary amine groups, or when the composition is to be employed immediately after the reactants are mixed to control fungi or promote the growth of higher plants, then the preferred practice is to add excess alkanolamine in amounts of from about 3 to 10 moles of alkanolamine per mole of zinc, the relatively larger excesses acting in many cases to dissolve or disperse the zinc-containing alkylenebisdithiocarbamate in the reaction medium. The complex compound which thereafter forms in the mixture or is precipitated therefrom will contain from 1 to 2 moles of alkanolamine per mole of zinc in most cases. Elemental analysis of the purified product can be employed to determine the ratio of zinc to alkanolamine obtained in any particular case. The excess of alkanolamine to be employed under particular reaction conditions can be increased or decreased depending upon whether the zinc: alkanolamine ratio in the product is higher or lower than the exact ratio desired. Routine variations in the excess alkanolamine employed will enable one to obtain a complex compound product having a particular ratio of zinc to alkanolamine.

In a convenient procedure, a zinc-containing alkylenebisdithiocarbamate, an alkanolamine and inert solvent, preferably water, and mixed together in any order or fashion. The reaction mixture is held at a temperature within the reaction temperature range for a period of time sufficient for the reaction to go to completion, with mixing being continued to maintain the zinc-containing alkylenebisdithiocarbamate in suspension. The reaction mixture containing the product can be employed directly in antifungal and plant growth regulatory operations, or the product can be separated by filtration and purified by washing with water or methanol.

DESCRIPTION OF THE PREFERRED EMBODIMENTS

The following examples are illustrative of the invention but are not to be construed as limiting.

EXAMPLE 1

Disodium ethylenebisdithiocarbamate hexahydrate (218.4 grams; 0.6 mole) is dissolved in 3 liters of water and the solution is mixed thoroughly with aminoethylethanolamine (62.4 grams; 0.6 mole). The solution is stirred while a solution of zinc chloride (81.77 grams; 0.6 mole) in 125 milliliters of water is added gradually thereto over a period of about ten minutes. A white precipitate forms in the reaction mixture during the addition of the zinc chloride. The reaction mixture is stirred for an additional thirty minutes after which the mixture is filtered. The filter cake is washed twice with water and once with methanol. The washed product is oven-dried overnight at a temperature of 40° C. The zinc ethylenebisdithiocarbamate·aminoethylethanolamine (1:1) product is obtained as a white, finely divided amorphous solid which is found to be substantially insoluble in water, alcohols and other organic solvents. The product has a melting point of about 133°–135° C. Elemental analysis is consistent with the assigned structure. The product is found by elemental analysis to have carbon, hydrogen, nitrogen and sulfur contents of 25.11, 4.59, 14.98 and 33.56 percent, respectively, as compared with theoretical values of 25.36, 4.74, 14.76 and 33.74 percent, respectively, calculated for the complex compound zinc ethylenebisdithiocarbamate·aminoethylethanolamine(1:1).

The above procedure is repeated with the sole variations being substitution of aminoethylethanolamine dihydrochloride for the aminoethylethanolamine and the addition of sufficient sodium hydroxide to adjust the pH of the mixture to about 7 immediately prior to the addition of the zinc chloride. The zinc ethylenebisdithiocarbamate·aminoethylethanolamine(1:1) product is obtained as a white finely divided solid which appears to melt on heating at about 133°–134° C. The structure of the product is confirmed by elemental analysis.

The above procedure is repeated employing 0.65 mole of disodium ethylenebisdithiocarbamate hexahydrate, 0.325 mole of aminoethylethanolamine and 0.65 mole of zinc chloride. The zinc ethylenebisdithiocarbamate·aminoethylethanolamine(2:1) product is obtained as a white finely divided solid which is substantially insoluble in water and organic solvents and which melts on heating at 143°–146° C. Elemental analysis of the product discloses the complex compound to have carbon, hydrogen, nitrogen, sulfur and zinc contents of 21.58, 3.58, 13.03, 38.52 and 20.1 percent, respectively, as compared to the theoretical values of 21.99, 3.67, 12.83, 39.1 and 19.97 percent, respectively, calculated for the named structure.

The above procedure is again repeated employing 0.028 mole of disodium 1,2-propylenebisdithiocarabamate, 0.02 mole of aminoethylethanolamine and 0.028 mole of zinc chloride. A zinc 1,2-propylenebisdithiocarbamate·aminoethylethanolamine(1.4:1) product is obtained as a white finely divided amorphous solid which is substantially insoluble in water and organic solvents and which decomposes on heating at about 129° C. Elemental analysis of the product discloses the complex compound to have carbon, hydrogen, nitrogen and sulfur contents of 25.4, 4.4, 13.2 and 35.2 percent, respectively, as compared to the theoretical values of 25.84, 4.53, 13.14 and 35.34 percent, respectively, calculated for the named structure.

Example 2

An aqueous suspension of zinc ethylenebisdithiocarbamate is prepared by slowly adding a solution of zinc chloride (88.59 grams; 0.65 mole) in 125 milliliters of water to a solution of disodium ethylenebisdithiocarbamate hexahydrate (236.6 grams; 0.65 mole) in 3 liters of water with vigorous stirring. The addition is carried out over a period of about six minutes. To the resulting stirred suspension is then slowly added, over a period of about five minutes, a solution of aminoethylethanolamine (33.8 grams; 0.325 mole) in 100 milliliters of water. The reaction mixture is then stirred for 30 minutes after which the solid present therein is filtered off and washed, first with water and then with methanol. All operations are conducted under ambient conditions. The washed solid is dried overnight at a temperature of 40° C. yielding 200 grams of an insoluble, finely divided, white amorphous solid. The structure of the zinc ethylenebisdithiocarbamate·aminoethylethanolamine (2:1) product is confirmed by elemental analysis.

In the remainder of the present specification, the following convention will be employed to express elemental analysis data. The elements assayed will be listed, each element being named by a conventional abbreviation, followed by the percentage of each named element found and lastly, by the percentage calculated to be present in the named product. In each list of found or calculated percentage values, the order in which the values are set out corresponds to the order in which the elements were named. For example, in the case of zinc 1,2-propylenebisdithiocarbamate·aminoethylethanolamine(16:1), the expression "C, H, N, S, Zn; found: 21.2, 2.9, 10.1, 43.2, 22.1; calculated: 21.3, 3.0, 10.1, 43.3, 22.1 percent" means that the named compound is found by elemental analysis to have carbon, hydrogen, nitrogen, sulfur and zinc contents of 21.2, 2.9, 10.1, 43.2 and 22.1 percent, respectively, as compared with the theoretical contents of 21.3, 3.0, 10.1, 43.3 and 22.1 percent, respectively, calculated for the named structure.

Example 3

A solution of 0.02 mole of zinc chloride and 0.12 mole of aminoethylethanolamine in 10 milliliters of water is mixed with a solution of 0.02 mole of disodium ethylenebisdithiocarbamate hexahydrate in about 10 milliliters of water. A white crystalline solid precipitates slowly in the reaction mixture. The mixture is held at ambient temperature and pressure for about 3 to 4 hours. The filter cake is washed with water and filtered and dried overnight in a 40° C. oven. The dried zinc ethylenebisdithiocarbamate·aminoethylethanolamine(0.5:1) product is found to melt at 123°–125° C. Elemental analysis confirms the composition of the product. C, H, N, S, Zn; found: 30.1, 6.1, 18.0, 27.7, 13.1; calculated: 29.8, 6.2, 17.4, 26.5, 13.5 percent. The product is substantially insoluble in water but forms stable dispersions in aqueous aminoethylethanolamine.

In substantially the same procedures as those employed above and in Examples 1 and 2, disodium ethylenebisdithiocarbamate, zinc chloride and aminoethylethanolamine are reacted together to prepare the following complex compounds, which are characterized by melting temperatures and by elemental analysis.

Zinc ethylenebisthiocarbamate·aminoethylethanolamine (3:1), melting at 163°–166° C.; C, H, N, S, Zn; found: 20.3, 3.3, 12.0, 41.2, 21.1 percent; calculated: 20.6, 3.2, 12.0, 41.3, 21.1 percent.

Zinc ethylenebisdithiocarbamate · aminoethylethanolamine(4:1), melting at 174°–177° C.; C, H, N, S, Zn; found: 19.7, 2.9, 11.5, 42.1, 21.7 percent; calculated: 19.9, 3.0, 11.6, 42.5, 21.7 percent.

Zinc ethylenebisdithiocarbamate · aminoethylethanolamine(6:1), melting at 180°–184° C.; H, S, Zn; found: 2.6, 43.6, 22.1 percent; calculated: 2.7, 43.7, 22.3 percent.

Zinc ethylenebisdithiocarbamate · aminoethylethanolamine(8:1), melting at 188°–190° C., C, H, Zn; found: 18.7, 2.6, 22.4 percent; calculated: 18.4, 2.6, 22.7 percent.

Zinc ethylenebisdithiocarbamate · aminoethylethanolamine(12:1), melting at 193°–196° C.; N, H, Zn; found: 10.7, 2.6, 22.6 percent; calculated: 10.7, 2.5, 23.0 percent.

Zinc ethylenebisdithiocarbamate · aminoethylethanolamine(16:1), melting at 198°–201° C.; C, N, Zn; found: 17.9, 10.7, 22.9 percent; calculated: 18.1, 10.6, 23.1 percent.

Example 4

0.02 Mole of disodium ethylenebisdithiocarbamate hexahydrate and 0.019 mole of aminoethylethanolamine are dissolved in 100 milliliters of water. A solution of 0.019 mole zinc chloride and 0.001 mole of manganese chloride in 3 milliliters of water is added to the resulting solution with vigorous stirring. After the addition is complete, the mixture is stirred for 30 minutes at ambient temperatures. The mixture is filtered and the filter cake is carefully washed with water and dried overnight in a 40° C. oven. The zinc(95)manganese dihydrate(5)ethylenebisdithiocarbamate·aminoethylethanolamine( 1 : 1 ) product is obtained as a white amorphous powder which melts at 125° C. The composition of the product is confirmed by elemental analysis. C, H, S, Zn, Mn; found: 25.1, 4.7, 34.2, 16.6, 0.7; calculated: 25.0, 4.7, 34.1, 16.5, 0.7 percent.

In substantially the same procedure, the following complex compounds are prepared.

Zinc(95)manganese dihydrate(5)ethylenebisdithiocarbamate·aminoethylethanolamine(2:1) is prepared as an insoluble light purple colored amorphous powder, melting at 153°–156° C., by the reaction of 0.02 mole of disodium ethylenebisdithiocarbamate, 0.019 mole zinc chloride, 0.001 mole manganese chloride and 0.0095 mole aminoethylethanolamine. C, H, N; found: 21.6, 3.8, 12.7; calculated: 21.7, 3.7, 12.7 percent.

Zinc(95)manganese dihydrate(5)ethylenebisdithiocarbamate·aminoethylethanolamine(3:1) is prepared as an insoluble purple amorphous powder, melting at 158°–161° C., by the reaction of 0.020 mole of disodium ethylenebisdithiocarbamate, 0.019 mole zinc chloride, 0.001 mole manganese chloride and 0.0063 mole aminoethylethanolamine in aqueous solution. C, H; found: 20.5, 3.0; calculated: 20.4, 3.2 percent.

Zinc(95)manganese dihydrate(5)ethylenebisdithiocarbamate·aminoethylethanolamine(4:1) is prepared as an insoluble purple amorphous powder, melting at 164°–167° C., by the reaction of 0.020 mole disodium ethylenebisdithiocarbamate, 0.019 mole zinc chloride, 0.001 mole manganese chloride and 0.0048 mole aminoethylethanolamine in aqueous solution.

Zinc(95)manganese dihydrate(5)ethylenebisdithiocarbamate·aminoethylethanolamine(8:1) is prepared as an insoluble faint purple amorphous powder, melting at 164°–167° C., by the reaction of 0.020 mole disodium ethylenebisdithiocarbamate, 0.001 mole manganese chloride, 0.019 mole zinc chloride and 0.0024 mole aminoethylethanolamine in aqueous solution.

Zinc(95)manganese dihydrate(5)ethylenebisdithiocarbamate·2-aminoethanol(2:1) is prepared as an amorphous insoluble powder containing 19.6 percent carbon, 11.3 percent nitrogen and 20.3 percent zinc by the reaction of 0.020 mole disodium ethylenebisdithiocarbamate with 0.019 mole zinc chloride, 0.001 mole manganese chloride and 0.0095 mole 2-aminoethanol in aqueous solution.

Zinc(95)copper(5)ethylenebisdithiocarbamate · aminoethylethanolamine(1:1) is obtained as a tan insoluble powder, melting at 129°–132° C., by the reaction of 0.019 mole each of zinc chloride and aminoethylethanolamine, 0.001 mole of cupric chloride and 0.020 mole of disodium ethylenebisdithiocarbamate. H, N, S; found: 4.5, 14.5, 33.9; calculated: 4.7, 14.6, 34.2 percent.

Zinc(95)iron(5)1,2 propylenebisdithiocarbamate·2-thiocarbamate·aminoethylethanolamine(8:1) is prepared as an insoluble finely divided amorphous solid having nitrogen and zinc contents of 10.3 and 20.5 percent by the reaction of 0.020 mole disodium 1,2-propylenebisdithiocarbamate, 0.001 mole manganese chloride, 0.019 mole zinc chloride and 0.0024 mole aminoethylethanolamine in aqueous solution.

Zinc(95)iron(5)1,2 - propylenebisdithiocarbamate·2-aminoethanol(2:1) is prepared as an amorphous insoluble powder containing 10.9 percent nitrogen and 19.6 percent zinc by the reaction of 0.20 mole disodium ethylenebisdithiocarbamate with 0.019 mole zinc chloride, 0.001 mole ferrous chloride and 0.0095 mole 2-aminoethanol in aqueous solution.

Example 5

A solution of 0.16 mole of aminoethylethanolamine and 0.02 mole zinc chloride in 50 milliliters of methanol is added dropwise to a solution of 0.02 mole of disodium ethylenebisdithiocarbamate hexahydrate in 75 milliliters of methanol with vigorous stirring. A white precipitate forms immediately upon the addition. The resulting mixture is then stirred for an additional thirty minutes after which it is filtered. The filter cake is washed with methanol and dried overnight in a 40° C. oven. The zinc ethylenebisdithiocarbamate·aminoethylethanolamine(0.5:1) product is obtained as a white, amorphous, finely divided solid which is substantially insoluble in water and organic solvents and which can be taken up in aqueous aminoethylethanolamine. The product is found to melt at 123°–125° C. Elemental analysis confirms the structure of the product. C, H, N, S; found: 29.9, 6.0, 17.7, 27.1; calculated: 29.8, 6.2, 17.4, 26.5 percent, In substantially the same procedure, the following complex compounds are prepared.

Zinc ethylenebisdithiocarbamate·diethanolamine(2:1) is obtained as a cream-colored insoluble powder, melting at 114°–116° C., by employing diethanolamine in lieu of the aminoethylethanolamine in the above procedure. C, H, N; found: 21.7, 3.6, 10.5; calculated: 21.9, 3.5, 10.7 percent.

Zinc ethylenebisdithiocarbamate·2,2'-(ethylenediimino)diethanol(2:1) is obtained as a cream-colored insoluble powder, melting at 117°–123° C., by employing 2,2'-(ethylenediimino)diethanol in lieu of aminoethylethanolamine in the above procedure.

Zinc(95)cobalt(5)ethylenebisdithiocarbamate · aminoethylethanolamine(3:1) is obtained as a lime green insoluble powder, melting at 164°–166° C., by employing 0.019 mole of zinc chloride, 0.007 mole of aminoethylethanolamine and 0.001 mole of cobalt chloride in the above procedure.

Zinc(50)cobalt(50)ethylenebisdithiocarbamate·aminoethylethanolamine(1:1) is obtained as a green insoluble powder, which decomposes without melting at 185°–189° C., by employing 0.01 mole each of zinc chloride and aminoethylethanolamine and 0.01 mole of cobalt chloride in the above procedure.

Example 6

0.4 Mole of disodium ethylenebisdithiocarbamate hexahydrate and 0.36 mole of aminoethylethanolamine are dissolved in 2 liters of water. To this solution is slowly added, with vigorous stirring, a solution of 0.36 mole zinc chloride, 0.012 mole ferric chloride, 0.008 mole cupric chloride and 0.02 mole of manganese chloride in 60 milliliters of water. After this addition is complete, the mixture is stirred at room temperature for about 0.5 hour. A solid precipitate forms during the mixing and stirring. The mixture is filtered and the filter cake is washed with water and dried overnight in a 40° C. oven. The zinc(90)iron III(3)copper(2)manganese dihydrate(5)ethylenebisdithiocarbamate·amino-ethylethanolamide(1:1) product is obtained as a beige-colored, insoluble, amorphous powder which melts at 124°–127° C. The composition of the product is confirmed by elemental analysis. C, H, N; found: 24.4, 4.4, 14.4; calculated: 24.7, 4.6, 14.4 percent.

The above procedure is repeated without substantial variation other than the designated changes in the named reactants to prepare the following complex compounds. The structure of each product is confirmed by elemental analysis.

Zinc(90)manganese dihydrate(5)iron III(3)copper(2) ethylenebisdithiocarbamate·aminoethylethanolamine(3:1) is obtained as a light gray insoluble powder, melting at 154°–160° C., by employing 0.12 mole of aminoethylethanolamine in the above procedure. C, H; found: 20.1, 3.2; calculated: 20.3, 3.2 percent.

Zinc(90)manganese dihydrate(5)iron III(5)-ethylenebisdithiocarbamate·aminoethylethanolamine (4:1) is obtained as a charcoal graycolored insoluble powder, melting at 158°–161° C., by employing 0.09 mole of aminoethylethanolamine and 0.020 mole of ferric chloride and omitting the cupric chloride in the above procedure.

Zinc(70)iron III(30)ethylenebisdithiocarbamate·aminoethylethanolamine(1:1) is obtained as a charcoal gray-colored insoluble powder, melting at 138°–142° C., by employing 0.28 mole each of zinc chloride and aminoethylethanolamine and 0.12 mole of ferric chloride and omitting the cupric chloride and manganese chloride in the above procedure.

Zinc(90)manganese dihydrate(5)iron III(5)-ethylenebisdithiocarbamate·aminoethylethanolamine(3:1) is obtained as a brown insoluble powder, which decomposes when heated to a temperature of 148°–152° C., by employing 0.12 mole of aminoethylethanolamine and 0.02 mole of feric chloride and omitting the cupric chloride in the above procedure.

Zinc(95)nickel(5)ethylenebisdithiocarbamate · aminoethylethanolamine(1:1) is obtained as a light green insoluble powder, melting at 129° C., by employing 0.38 mole each of zinc chloride and aminoethylethanolamine and 0.020 mole of nickel chloride and omitting the manganese, ferric and cupric chlorides in the above procedure.

C, H, N, S; found: 25.0, 4.6, 14.9, 34.5; calculated: 25.0, 4.6, 14.6, 34.2 percent.

Zinc(95)iron III(5)ethylenebisdithiocarbamate·aminoethylethanolamine(1:1) is obtained as a brown insoluble powder, melting at 128°–131° C., by employing 0.38 mole each of zinc chloride and aminoethylethanolamine and 0.02 mole of ferric chloride and omitting the manganese chloride and cupric chloride in the above procedure.

Zinc (30) manganese (70) ethylenebisdithiocarbamate·aminoethylethanolamine(16:1) is obtained as an insoluble amorphous powder containing 16.9 percent carbon, 44.3 percent sulfur and 6.8 percent zinc by employing 0.12 mole of zinc chloride, 0.0075 mole of aminoethylethanolamine and 0.28 mole of manganese chloride and omitting the ferric and cupric chlorides in the above procedure, and drying the product at 70° C.

Zinc (95) copper (5) 1,2-propylenebisdithiocarbamate·aminoethylethanolamine(1:1) containing 27.2 percent carbon, 33 percent sulfur and 16 percent zinc is obtained as an amorphous insoluble powder by the reaction of 0.019 mole each of zinc chloride and aminoethylethanolamine, 0.001 mole of cupric chloride and 0.020 mole of disodium 1,2-propylenebisdithiocarbamate and omitting the ethylenebisdithiocarbamate salt and the manganese and ferric chlorides in the above procedure.

Zinc (70) nickel(30)ethylenebisdithiocarbamate·amioethylethanolamine(1:1) is obtained as a green insoluble powder, melting at 124°–127° C., by employing 0.28 mole each of zinc chloride and aminoethylethanolamine and 0.12 mole of nickel chloride and omitting the manganese, ferric and cupric chlorides in the above procedure. H, N; found: 4.11, 13.73; calculated: 4.16, 13.75 percent.

Zinc(95)cobalt III(5)ethylenebisdithiocarbamate·aminoethylethanolamine(3:1) is obtained as a green insoluble powder containing 20.5 percent carbon, 12 percent nitrogen and 20.2 percent zinc by employing 0.38 mole of zinc chloride, 0.127 mole of aminoethylethanolamine and 0.02 mole of cobaltic chloride and omitting the manganese chloride and cupric chloride in the above procedure.

Example 7

0.6 Mole of disodium ethylenebisdithiocarbamate hexahydrate is dissolved in 3 liters of water and the resulting solution is mixed with stirring with 0.2 mole of aminoethylethanolamine and 0.2 mole of ethanolamine. A solution of 0.6 mole zinc chloride in 125 milliliters of water is added to the mixture with stirring over a ten minute period. After this addition is complete, the mixture is stirred for about 0.5 hour. The mixture is filtered and the filter cake is washed with water and dried overnight at a temperature of 40° C. The zinc ethylenebisdithiocarbamate · aminoethylethanolamine(3:1)·ethanolamine(3:1) product is obtained as a white insoluble amorphous powder which melts at 140°–144° C. The composition of the product is confirmed by elemental analysis. C, H, Zn; found: 21.6, 3.6, 19.9; calculated: 21.8, 3.7, 19.8 percent.

The above procedure is repeated without substantial variation other than the designated changes in the amounts of the named reactants to prepare the following complex compounds. The structure of each product is confirmed by elemental analysis.

Zinc ethylenebisdithiocarbamate·ethanolamine(8:1) is obtained as a white insoluble powder, melting at 200°–203° C., by employing 0.075 mole of ethanolamine and omitting the aminoethylethanolamine in the above procedure.

Zinc ethylenebisdithiocarbamate · 2-[2-(2-aminoethyamino)ethyl]aminoethanol(12:1) is obtained as a white insoluble powder, melting at 178°–181° C., by employing 0.05 mole of 2-[2-(2-aminoethylamino)ethyl]-aminoethanol in lieu of the aminoethylethanolamine and aminoethanol in the above procedure. C, H, N; found: 18.7, 2.6, 10.7; calculated: 18.8, 2.6, 11.0 percent.

Zinc ethylenebisdithiocarbamate · 2,2′ - (diethylenetriimino)diethanol(2:1) is obtained as a white insoluble powder by employing 0.30 mole of 2,2′-(diethylenetriimino)diethanol in lieu of the aminoethylethanolamine and aminoethanol and ethanol in lieu of water in the above procedure.

Zinc ethylenebisdithiocarbamate·2-[2-(2-aminoethylamino)ethyl]aminoethanol(6:1) is obtained as a white insoluble powder, melting at 171°–174° C., by employing 0.1 mole of 2-[2-(2-aminoethylamino)ethyl]aminoethanol in lieu of the aminoethylethanolamine and aminoethanol in the above procedure.

Zinc ethylenebisdithiocarbamate·2-[2-(2-aminoethylamino)ethyl]aminoethanol(3:1) is obtained as a white insoluble powder, melting at 156°–158° C., by employing 0.2 mole of 2-[2-(2-aminoethylamino)ethyl]aminoethanol in lieu of the aminoethylethanolamine and aminoethanol in the above procedure. H, N, Zn; found: 3.6, 12.4, 19.87; calculated: 3.6, 12.95, 20.15 percent.

Zinc ethylenebisdithiocarbamate·ethanolamine(1:1) is obtained as a white insoluble powder, melting at 140°–142° C., by employing 0.60 mole of ethanolamine and omitting the aminoethylethanolamine in the above procedure. C, H, Zn; found: 21.2, 3.7, 19.4; calculated: 21.4, 3.9, 19.4 percent.

Zinc ethylenebisdithiocarbamate·ethanolamine(4:1) is obtained as a white insoluble powder, melting at 198°–202° C., by employing 0.15 mole of ethanolamine and omitting the aminoethylethanolamine in the above procedure. C, N, Zn; found: 18.3, 10.6, 22.6; calculated: 18.6, 10.8, 22.5 percent.

Example 8

0.4 Mole of disodium ethylenebisdithiocarbamate hexahydrate and 0.36 mole of aminoethylethanolamine are dissolved in 2 liters of water. To this solution is slowly added, with vigorous stirring, a solution of 0.36 mole zinc chloride and 0.04 mole of manganese chloride in 60 milliliters of water. Ambient conditions are used. After this addition is complete, the mixture is stirred for about 0.5 hour during which time a solid precipitate forms. The mixture is filtered and the filter cake is washed with water and dried overnight in a 40° C. oven. The zinc(90)manganese dihydrate(10)ethylenebisdithiocarbamate·aminoethylethanolamine(1:1) product is obtained as a light brown insoluble amorphous powder which melts at 129° C. The composition of the product is confirmed by elemental analysis. C, H; found: 24.4, 4.6; calculated: 24.55, 4.63 percent.

The above procedure is repeated without substantial variation other than the designated changes in the amounts of the named reactants to prepare the following complex compounds. The structure of each product is confirmed by elemental analysis.

Zinc(80)manganese dihydrate(20)ethylenebisdithiocarbamate·aminoethylethanolamine(1:1) is obtained as a light brown insoluble powder, melting at 142°–144° C., by employing 0.32 mole each of zinc chloride and aminoethylethanolamine and 0.08 mole of manganese chloride.

Zinc(80)manganese dihydrate(20)ethylenebisdithiocarbamate·aminoethylethanolamine(1.6:1) is obtained as a light tan insoluble powder, melting at 144°–146° C., by employing 0.32 mole of zinc chloride, 0.20 mole of aminoethylethanolamine and 0.08 mole of manganese chloride.

Zinc(70)manganese dihydrate(30)ethylenebisdithiocarbamate·aminoethylethanolamine(1:1) is obtained as a light brown insoluble powder, melting at 141°–144° C., by employing 0.28 mole each of zinc chloride and aminoethylethanolamine and 0.12 mole of manganese chloride.

Zinc(60)manganese dihydrate(40)ethylenebisdithiocarbamate·aminoethylethanolamine(1:1) is obtained as a brown insoluble solid, melting at 137°–140° C., by employing 0.24 mole each of zinc chloride and aminoethylethanolamine and 0.16 mole of manganese chloride.

Zinc(50)manganese dihydrate(50)ethylenebisdithiocarbamate·aminoethylethanolamine(3:1) is obtained as a purple-brown insoluble powder, melting at 153°–155° C., by employing 0.20 mole of zinc chloride, 0.067 mole of aminoethylethanolamine and 0.20 mole of manganese chloride.

Zinc(30)manganese dihydrate(70)ethylenebisdithiocarbamate·aminoethylethanolamine(3:1) is obtained as a brown insoluble powder, melting at 158°–161° C., by employing 0.12 mole of zinc chloride, 0.04 mole of aminoethylethanolamine and 0.28 mole of manganese chloride. H, N, Zn; found: 3.3, 10.0, 42.6; calculated: 3.3, 10.1, 42.2 percent.

The complex compounds of the invention can be used to alter the growth of plants including both fungel plants and the higher plants. When the complex compounds are employed to control fungus attack, the complex compounds are employed by contacting fungi and their habitats with a plant growth-altering amount which is also an antifungal amount of one or more of the complex compounds, the term "habitat" here being used in its broadest sense to include higher plants and plant parts thereof, growth media and any other spaces, areas or surfaces with which fungi may come into contact. The term "higher plant" includes the chlorophyllous plants having leaves, stems, roots and the like such as the angiospermae and gymnospermae. When the complex compounds are employed as plant growth stimulants, they are employed by contacting portions of higher plants including plant parts such as the leaves, stems, seeds, flowers or fruits thereof with a plant growth-altering amount which is also a growth-stimulating amount of one or more of the compounds. In general, when the compounds are employed to control fungal attack on higher plants or plant parts, an antifungal amount is also a growth-stimulating amount to the higher plant, so that contacting higher plants with an antifungal amount of a complex compound also provides stimulation and improvement of the growth of the higher plant.

In such operations, the complex compounds are advantageously employed to control fungal attack or stimulate growth or both on such representative higher plants as almond, apple, apricot, banana, cherry, peach, pear grape, carrot, tomato, cabbage, cucumber, cantaloupe, spinach, potato, beet, corn, hops, rice, wheat, beans, cotton, lettuce, onions, celery, tobacco and other crop plants as well as ornamental shrubs and flowering plants and turf grasses. In such operations, the higher plant or plant part is contacted with a plant growth-altering amount of a complex compound of the invention. Such plant growth-altering amount is at least an antifungal amount or a growth-stimulating amount, depending on the effects or combination of effects to be produced. It is essential that such antifungal or growth-stimulating amount be less than a phytotoxic amount, that is, the amount of complex compound which deleteriously affects the growth of the higher plant by injuring the higher plant or plant parts, substantially inhibiting the growth, flowering or reproduction thereof or the like. For example, when applied to growing plants, application rates in excess of about 25 pounds of complex compound per acre is generally unnecessary to obtain good antifungal and growth-stimulating results, and can produce phytotoxic responses and inhibition of the growth of many higher plants. Excellent control of fungi and stimulation of the growth of higher plants is observed when the complex compounds are applied to the above-ground portions of higher plants in amounts from about 0.004 to about 3 pounds of complex compound per acre or when aerial portions of higher plants are contacted with compositions containing from about 25 to about 2400 or more parts by weight of complex compound per million parts by weight of total composition. Similarly, application of complex compounds to seeds of higher plants in amounts of from about 0.5 ounce to about 16 ounces of complex compound per 100 pounds of seed provides excellent control of fungi without inhibiting germination of the seed and growth of plants therefrom.

When it is desired to control fungi and effects on higher plants can be disregarded as when wood, storage bins, paper, cloth and the like are to be treated, or when fungal control is to be obtained in fungal growth media other than the aerial portions of higher plants such as in the treatment of soil or orchard floors, the complex compounds are employed in a plant growth-altering amount which is an antifungal amount. In such operations, the compositions are applied at rates of from about 0.004 to about 3, to about 100 pounds per acre or in amounts sufficient to provide the complex compound in the fungal habitat in concentrations of at least 1 part by weight of complex compound per million parts by weight of fungal habitat or substrate. For application to soil, it is usually unnecessary to apply more than about 100 pounds of complex compound per acre of soil, and in most cases, excellent antifungal results can be obtained at application rates of from about 0.004 to about 50 pounds per acre. In other operations, the complex compounds are applied to fungi or their growth media or habitats, wrapping papers, storage bins and the like as compositions containing at least about one part or more by weight of complex compound per million parts by weight of growth media or habitat such as soil, wood, paper or the like.

The complex compounds can be employed in their unmodified form or they can be employed in compositions comprising additaments and adjuvants, preferably a non-phytotoxic adjuvant. The term "non-phytotoxic adjuvant" refers to conventional fungicide adjuvants which are not substantially deleterious to plant leaves, stems, flowers, fruit and the like and not substantially inhibitory to the growth of plants at rates of application of complex compounds consistent with good plant growth-altering activity. Such compositions can contain from about 0.0001 or less to about 2 percent or more by weight of a complex compound. Liquid compositions can include one or more fungicide adjuvant such as aqueous alkanolamines, alcohols, acetone, toluene, petroleum distillates, dimethylsulfoxide and the like. Dust compositions can be formulated by employing finely divided solid adjuvants such as powdered walnut shells, pyrophyllite, chalk, talc, gypsum or the like and can include solid surface active dispersing agents such as fuller's earth, bentonite, kieselguhr, attapulgite clay and the like. The compositions can also be prepared as concentrate compositions containing from about 2 to about 98 percent of a complex compound. Such compositions are adapted to be diluted by admixture with additional adjuvants prior to use.

The complex compounds can also be incorporated with other active agents to provide combinations of effects or synergistic results in particular operations. For example, the compositions can include additional fungicides or preservatives such as the phenolic preservatives, halogenated salicylanilides, sulfur, copper fungicides and the like; insecticides, nematocides, fumigants and other pesticides such as dichlorodiphenyltrichloroethane, hexachlorocyclohexane, malathion, diethyl-p-nitrophenylmonothiophosphate, methyl bromide, ethylene dibromide, O,O-diethyl O-(3,5,6 - trichloro-2-pyridyl)phosphorothioate, 4-dimethylamino-3,5-xylyl methylcarbamate and the like; fertilizers including ammonium, phosphate and urea fertilizers and trace mineral plant nutrients; and pre-emergent or post-emergent herbicides such as the halogenated phenoxy aliphatic acids, dinitro-secondary-butylphenol, 3-(3,4-dichlorophenyl)-1,1-dimethylurea and the like. When the complex compounds are employed to treat higher plants, any other active agents are selected to provide a composition which will provide the desired additional effects such as control of insects, slugs, nematodes and weeds without adversely affecting the plant species treated.

The compositions can also be formulated as wettable powders including ionic or non-ionic surface active dispersing agents. A preferred group of compositions includes those comprising a complex compound and a surface active dispersing agent. The term "surface active dispersing agent" is employed herein to include all agents which are capable of acting as the interfacial surface between the complex compounds and water or an organic liquid as the dispersion medium, facilitating thereby the dispersion of the complex compound in water or organic liquid to form dispersible concentrate compositions or the like. Representative surface active dispersing agents include bentonite, fuller's earth, attapulgite and other clays, condensation products of alkylene oxides with phenols and organic acids, alkyl aryl sulfonates, fatty acid esters of sugars and ethylene oxide derivatives thereof, polyoxyethylene derivatives of sorbitan esters, complex alcohols, mahogany soaps and the like. Other suitable surface active dispersing agents can be found in "Detergents and Emulsifiers, Up to Date" written and published by John W. McCutcheon, Inc., Morristown, N.J., 1967. The preferred compositions comprising a complex compound and a surface active dispersing agent can be treating compositions containing from about 0.0001 or less to about 2 or more percent by weight of the complex compound, or they can be concentrate compositions containing from about 2, to 40, to 50, to 90, to 98 percent by weight of a complex compound. The concentrate compositions can be diluted by the addition of water, organic solvents, additaments, nonphytotoxic adjuvants and the like to prepare the ultimate treating compositions.

Another preferred group of compositions includes those comprising a complex compound and a dispersion stabilizer. The term "dispersion stabilizer" is employed herein to include those agents which act to promote the dispersion of the complex compounds in aqueous or organic liquid systems and to inhibit the settling of solids therefrom, and which generally act to increase the viscosity of the liquid dispersion medium. Such dispersion stabilizers also contribute to the holding of the active complex compounds on plant parts or the like when the compositions are employed as sprays. Representative dispersion stabilizers which can be employed include alginic acid, blood albumin, carboxymethyl cellulose, casein, gluten, starch, linear and/or cross-linked polyacrylamides, natural and artificial gums such as gum arabic, guar gum, lignin sulfonates, such as alkali metal, alkaline earth metal, ferrous or ammonium lignin sulfonates, hydroxypropylmethyl cellulose and hydroxypropyl cellulose, pectins, gelatin and the like and compatible mixtures thereof. Compositions comprising from about 5 to about 80 to about 99.75 percent by weight of a complex compound and from about 0.25 to about 20 to about 95 percent by weight of a dispersion stabilizer provide excellent plant growth-altering results in liquid dispersions. Such compositions provide deposits of increased amounts of complex compounds on plant parts when applied as sprays at given application rates. Spray compositions containing a complex compound and from about 0.25 to about 20 percent by weight of a dispersion stabilizer selected from the sodium, potassium, calcium, magnesium, ferrous and ammonium lignin sulfonate salts, the lower alkyl and hydroxy lower alkyl cellulose ethers wherein lower alkyl is methyl, ethyl or propyl are particularly preferred, and sodium lignin sulfonate is a dispersion stabilizer of choice.

The complex compounds and compositions containing the same can be applied to plants, fungi or growth media by conventional procedures including spraying, dipping, dusting, rolling onto plant seeds, application to soil with or without subsequent incorporation by disking or the like, impregnation, dispersion in irrigation water or the like. The compositions can be applied at rates varying from a few pounds or gallons to several hundred pounds or gallons per acre, depending upon such factors as the concentration of complex compound and the effect to be produced, so long as plants, plant parts or their habitats are contacted with a growth-altering amount of a complex compound.

In a representative operation, excellent control of late blight organism, Phytophthora infestans, is obtained when tomato plants are treated with an aqueous composition containing one of zinc ethylenebisdithiocarbamate·aminoethylethanolamine(1:1), zinc ethylenebisdithiocarbamate·aminoethylethanolamine(8:1), zinc ethylenebisdithiocarbamate·aminoethylethanolamine(16:1) zinc ethylenebisdithiocarbamate·2-[2-(2 - aminoethylamino)ethyl] aminoethanol(2:1), zinc 1,2-propylenebisdithiocarbamate·aminoethylethanolamine(1.4:1), zinc ethylenebisdithiocarbamate·ethanolamine(2:1) or zinc(95)manganese dihydrate(5)ethylenebisdithiocarbamate·ethanolamine(0.5:1) as the sole active agent therein and at a concentration of 1200 parts by weight of complex compound per million parts by weight of composition. In such operations, the compositions are applied as sprays to the above-ground portions of tomato plants and the plants are thereafter inoculated with a suspension of viable spores of Phytophthora infestans (late blight). Similar plants not thus treated with a complex compound are similarly inoculated to serve as checks. All the plants are held for four days under conditions of temperature and high humidity conducive to the growth of the fungal organism. Observations of the plants treated with a complex compound of the invention show excellent control of fungal attack and prevention of late blight infestation, the treated plants being healthy and growing vigorously, while the untreated check plants show heavy fungal infestation with attendant injury to the plants.

In a similar representative operation, excellent controls of Plasmophora viticola are obtained when the above-ground portions of grape plants are treated with aqueous spray compositions containing one of zinc(95)copper(5) ethylenebisdithiocarbamate · aminoethylethanolamine(1:1), zinc(60) manganese dihydrate(40)ethylenebisdithiocarbamate·aminoethylethanolamine(1:1), zinc(95)nickel(5)ethylenebisdithiocarbamate · aminoethylethanolamine (1:1), zinc(90)manganese dihydrate(5)iron III(5)ethylenebisdithiocarbamate · aminoethylethanolamine(4:1) or zinc ethylenebisdithiocarbamate·ethanolamine(3:1)·aminoethylethanolamine(3:1) as the sole active ingredient therein at a concentration of 600 parts per million, and the plants are thereafter inoculated with viable spores of Plasmophora viticola, the downy mildew organism. The treated plants are observed to be in a state of vigorous healthy growth throughout the test period.

In other representative operations, aqueous suspensions containing 600 parts per million of one of zinc ethylenebisdithiocarbamate·aminoethylethanolamine(1:1) or zinc 1,2-propylenebisdithiocarbamate·aminoethylethanolamine (1:1) are applied to portions of the leaves of young bean plants. The suspensions are applied in uniform droplets of 50 microliters each and allowed to dry overnight. The bean plants are then inoculated over the entire leaf surface with viable spores of bean rust (Uromyces phaseoli) and held for one week under conditions conducive to the growth of bean rust. Similar untreated plants are similarly inoculated and held to serve as checks. At the end of the test period, the check plants show widespread eruption of bean rust pustules over the entire inoculated leaf surface. Observations of the treated plants show pustule-free zones of leaf surface surrounding each portion treated with a complex compound and extending about 2 centimeters beyond such treated portions. Such results indicate redistribution and translocation of the complex compound through the plant structure without significant loss of antifungal activity. In other representative operations, mature healthy grape plants of the Carignane variety are sprayed three times through the grape blooming period at approximately one week intervals with an aqueous suspension containing one pound of zinc ethylenebisdithiocarbamate· aminoethylethanolamine(1:1) per 100 gallons, the spray being applied at a plant growth-altering amount of approximately 100 gallons per acre. Similar grape plants are left untreated to serve as checks. No injury to any of the plants is detected and at the end of the growing season, the yield and quality of the fruit is determined. The check plants are found to produce about 12.1 pounds of grapes per vine, about 22.5 precent of such grapes being #1 market grade. The plants treated with zinc ethylenebisdithiocarbamate·aminoethylethanolamine(1:1) are found to produce about 21.7 pounds of grapes per vine, with about 44 percent of such grapes being #1 grade.

The alkanolamine starting materials employed to prepare the complex compounds of the invention can be prepared in conventional procedures by the reaction of ethylene oxide with excess ammonia or with an excess alkylamino or hydroxyalkylamino compound. The reaction is carried out by mixing the ethylene oxide with excess ammonia, alkylamine or hydroxyalkylamine in a lower alcohol as a reaction medium. The reaction proceeds readily at ambient temperatures and pressures, and the desired alkanolamine product can be obtained by conventional techniques such as by stripping off the reaction medium and any unreacted starting materials. For example, aminoethylethanolamine can be prepared by adding ethylene oxide to an excess of ethylenediamine. Diethanolamine is prepared by adding ethylene oxide to an excess of 2-aminoethanol dissolved in ethanol. The reaction proceeds rapidly under ambient conditions, and the desired product is recovered from the crude reaction mixture by fractional distillation under reduced pressure.

The water-soluble alkylenebisdithiocarbamate starting materials can be prepared by known methods such as those described in United States Pats. Nos. 2,317,765, 2,609,389 and 2,844,623. In a representative method, the soluble alkylenebisdithiocarbamates of such metals as sodium lithium or potassium or of ammonium are prepared by the reaction of carbon disulfide with ethylenediamine or 1,2-propylenediamine and a base which can be an alkali metal hydroxide or ammonium hydroxide. The reaction is carried out in an inert solvent for the ethylenediamine or 1,2-propylenediamine such as methanol, ethanol, isopropanol or water and proceeds at temperatures of from about 25° to 50° C. The alkylenebisdithiocarbamate product is obtained as a solution in the inert solvent. The solvent of product can be employed directly in the preparation of the complex compounds of the invention, or it can be reduced in volume by evaporation or distillation to remove all or part of the solvent.

The zinc alkylenebisdithiocarbamate starting materials employed to prepare the complex compounds can be prepared by conventional methods. In a representative procedure, the salt can be formed by the metathetic reaction of a water-soluble zinc salt with a water-soluble alklenebisdithiocarbamate. The reaction is carried out in an aqueous solvent as a reaction medium and the insoluble zinc alkylenebisdithiocarbamate is obtained as a precipitate. Alternatively, the insoluble zinc alkylenebisdithiocarbamate can be prepared by mixing carbon disulfide with an aqueous solution of the ethylenediamine and a water-soluble zinc salt. The zinc alkylenebisdithiocarbamate product is obtained as a precipitate.

The polymetallic zinc-containing alkylenebisdithiocarbamate starting materials are members of a known class of polymeric compounds which can be described as "coreacted alkylenebisdithiocarbamates" in accordance with Nemec et al., U.S. Pat. No. 3,210,394. They can be prepared in methods analogous to those of Nemec et al. by the metathetic reaction of a water-soluble alkylenedisdithiocarbamate salt such as an alkali metal or ammonium salt with a mixture of water-soluble salts of zinc and the additional metal or metals such as the chlorides, sulfates, acetates or the like. The zinc and additional metal salts are employed in the molar ratio which is desired in the polymetallic product. The reaction is conveniently carried out in water as a reaction medium. The product precipitates from the reaction mixture and can be purified by conventional techniques such as washing.

The polymetallic zinc-containing alkylenebisdithiocarbamate materials can be characterized and distinguished from mixtures of metallic salts by their physical properties in procedures such as those described by Nemec et al. and including elemental analysis, X-ray diffraction and spectroscopic analysis.

The polymetallic zinc-containing alkylenebisdithiocarbamate starting materials can also be prepared by the reaction of ethylenediamine or 1,2-propylenediamine, carbon disulfide and a mixture of soluble salts of zinc and the additional metal or metals. Such procedure is analogous to that employed for the preparation of zinc alkylenebisdithiocarbamates.

What is claimed is:

1. A method comprising contacting higher plants, plant parts and their habitats with an antifungal amount of a metallic zinc-containing alkylenebisdithiocarbamate·alkanolamine complex compound wherein the metal is from 30 to 100 mole percent zinc and from 70 to zero mole percent of an additional metal selected from the group consisting of manganese, nickel, iron, cobalt and copper; the alkanolamine corresponds to one or more alkanolamine of the formula

in which R represents a member of the group consisting of hydrogen and 2-hydroxyethyl and $x$ represents one of the integers two or three; and the molar ratio of zinc to the alkanolamine is from 16:1 to 0.5:1, inclusive.

2. The method of Claim 1 wherein the complex compound is contacted with an aerial portion of a higher plant by contacting said aerial portion with a composition containing from about 25 to about 2400 parts by weight of complex compound per million parts of composition.

3. The method of Claim 1 wherein the complex compound is contacted with a seed of a higher plant in an amount of from about 0.5 ounce to about 16 ounces of complex compound per 100 pounds of seed.

4. The method of Claim 1 wherein the compound is a zinc-containing ethylenebisdithiocarbamate·alkanolamine complex compound.

5. The method of Claim 4 wherein the additional metal is selected from the group consisting of manganese and iron; the molar ratio of zinc to the alkanolamine is from about 8:1 to about 1:1; and the metal is from about 70 to about 100 mole percent zinc.

6. The method of Claim 5 wherein the alkanolamine is aminoethylethanolamine.

7. An antifungal composition comprising a non-phytotoxic adjuvant in intimate admixture with an amount of from about 5 to about 99.75 percent by weight of a metallic zinc-containing alkylenebisdithiocarbamate·alkanolamine complex compound wherein the metal is from 30 to 100 mole percent zinc and from 70 to zero mole percent of an additional metal selected from the group consisting of manganese, nickel, iron cobalt and copper; the alkanolamine corresponds to one or more alkanolamines of the formula

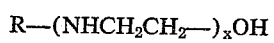

in which R represents a member of the group consisting of hydrogen and 2-hydroxyethyl and $x$ represents one of the integers two or three; and the molar ratio of zinc to the alkanolamine is from 16:1 to 0.5:1, inclusive.

8. The composition of Claim 7 wherein the adjuvant is a surface active dispersing agent.

9. The composition of Claim 7 wherein the adjuvant is a dispersion stabilizer.

10. The composition of Claim 9 wherein the dispersion stabilizer is a lignin sulfonate selected from the group consisting of alkali metal lignin sulfonates, alkaline earth metal lignin sulfonates, ferrous lignin sulfonate and ammonium lignin sulfonate.

11. The composition of Claim 9 wherein the composition comprises from about 5 to about 99.75 percent by weight of a complex compound and from about 0.25 to about 95 percent by weight of the dispersion stabilizer.

12. The composition of Claim 7 wherein the compound is a zinc-containing ethylenebisdithiocarbamate·aminoethylethanolamine complex compound.

13. The composition of Claim 12 wherein the additional metal is selected from the group consisting of manganese and iron; the molar ratio of zinc to the alkanolamine is from 8:1 to about 1:1; and the metal is from about 70 to 100 mole percent zinc.

References Cited

UNITED STATES PATENTS

| | | | |
|---|---|---|---|
| 3,558,302 | 1/1971 | Salvensen | 71—93 X |
| 3,441,581 | 4/1969 | Windel et al. | 424—289 |
| 3,499,018 | 3/1970 | Stevenson | 424—287 |

JAMES O. THOMAS, Jr., Primary Examiner

U.S. Cl. X.R.

71—77, 97; 424—287, 294, 295

PO-1050
(5/69)

UNITED STATES PATENT OFFICE
CERTIFICATE OF CORRECTION

Patent No. 3,826,846               Dated July 30, 1974

Inventor(s)   Robert L. Noveroske

It is certified that error appears in the above-identified patent and that said Letters Patent are hereby corrected as shown below:

Column 2, line 5, "alklenebisdithiocarba-" should read -- alkylenebisdithiocarba- --.

Column 2, line 59, "ethylenebisdithiocabamate.alkanolamines" should read -- ethylenebisdithiocarbamate.alkanolamines --.

Column 2, line 62, "immedaitely" should read -- immediately -

Column 4, line 26, "acteristics" should read -- acteristic --

Column 8, line 32, "and" should read -- are --.

Column 8, line 5, "prepared" should read -- prepare --.

Column 9, line 26, "1,2-propylenebisdithiocarabamate" should read -- 1,2-propylenebisdithiocarbamate --.

Column 10, line 27, "ethylenebisthiocarbamate.aminoethyl-ethanolamine" should read -- ethylenebisdithiocarbamate.-aminoethylethanolamine --.

Column 11, line 37, "iron(5)" should read -- manganese dihydrate(5) --; and at the end of line 37 "2-" should be deleted as well as "thiocarbamate" at the beginning of line 38.

Column 11, line 48, "0.20" should read -- 0.020 --.

Column 12, line 34, "thiocarbamate.amino-ethylethanolamide" should read -- thiocarbamate.amino-ethylethanolamine --.

Column 12, line 68, "feric" should read -- ferric --.

NOTE: Corrections contintued on second sheet.

PO-1050
(5/69)

UNITED STATES PATENT OFFICE
CERTIFICATE OF CORRECTION  Continuted

Patent No. 3,826,846                 Dated    July 30, 1974

Inventor(s)   Robert L. Noveroske                 Page - 2

It is certified that error appears in the above-identified patent and that said Letters Patent are hereby corrected as shown below:

Column 13, line 26, "nickel(30)ethylenebisdithiocarbamate.amio" should read -- nickel(30)ethylenebisdithiocarbamate.amino --.

Column 13, line 67, "2-[2-(2-aminoethy-" should read -- 2-[2-(2-aminoethyl --.

Column 15, line 12, "fungel" should read -- fungal --.

Column 19, line 7, "12.1" should read -- 12.2 --.

Column 19, line 8, "precent" should read -- percent --.

Column 19, line 44, "solvent" should read -- solution --.

Column 19, line 53, "alklene-" should read -- alkylene --.

Column 19, line 68, "alkylenedisdi-" should read -- alkylenebisdi- --.

Signed and sealed this 4th day of February 1975.

(SEAL)
Attest:

McCOY M. GIBSON JR.
Attesting Officer

C. MARSHALL DANN
Commissioner of Patents